United States Patent [19]
Ford

[11] 4,321,745
[45] Mar. 30, 1982

[54] SEALING METHOD

[75] Inventor: R. Gary Ford, Memphis, Tenn.

[73] Assignee: Energy Design Corp., Memphis, Tenn.

[21] Appl. No.: 144,354

[22] Filed: Apr. 28, 1980

[51] Int. Cl.³ .................................................. B23P 19/00
[52] U.S. Cl. ...................................... 29/526 R; 52/410; 126/450
[58] Field of Search ................... 29/526 R; 52/741, 58, 52/60, 62, 410; 126/451, 450; 285/189

[56] References Cited

U.S. PATENT DOCUMENTS

| | | | |
|---|---|---|---|
| 1,883,508 | 10/1932 | Bonday | 52/58 X |
| 3,141,532 | 7/1964 | Runyan | 29/526 R UX |
| 3,196,733 | 7/1965 | Cohen et al. | 29/526 R UX |
| 3,255,559 | 6/1966 | Gaeth et al. | 52/410 X |
| 3,300,850 | 1/1967 | Steuernagel | 29/526 R X |
| 3,408,780 | 11/1968 | Brister | 52/58 |
| 4,034,530 | 7/1977 | Vallee | 29/526 R |
| 4,074,501 | 2/1978 | Sandquist | 52/410 X |
| 4,119,083 | 10/1978 | Heyen et al. | 126/450 X |
| 4,223,667 | 9/1980 | Paymal | 126/450 |

FOREIGN PATENT DOCUMENTS

| | | | |
|---|---|---|---|
| 286190 | 4/1935 | Italy | 29/526 R |
| 1002864 | 9/1965 | United Kingdom | 285/189 |

*Primary Examiner*—Charlie T. Moon
*Attorney, Agent, or Firm*—Martin Novack

[57] ABSTRACT

An improved method of sealing and attaching, in a weathertight manner, a mounting support, such as a mounting support of an equipment, to a roof surface. A flared hole is formed in a sheet of metal flashing. The flashing is placed on the roof with the flared hole thereof aligned with a hole in the roof and protruding upward from the roof. A resilient pad is applied to the roof flashing over the flared hole, with a hole in the pad surrounding the flared hole in the roof flashing. The mounting support is then bolted to the roof surface by passing a bolt through the mounting support, the pad, and the aligned holes. The bolt engages the mounting support and the underside of the roof surface so as to secure the mounting support to the roof surface with the flashing and resilient pad pressed therebetween. This sealing technique provides a reliable water-tight seal through which water cannot readily penetrate, even over long periods of time.

1 Claim, 1 Drawing Figure

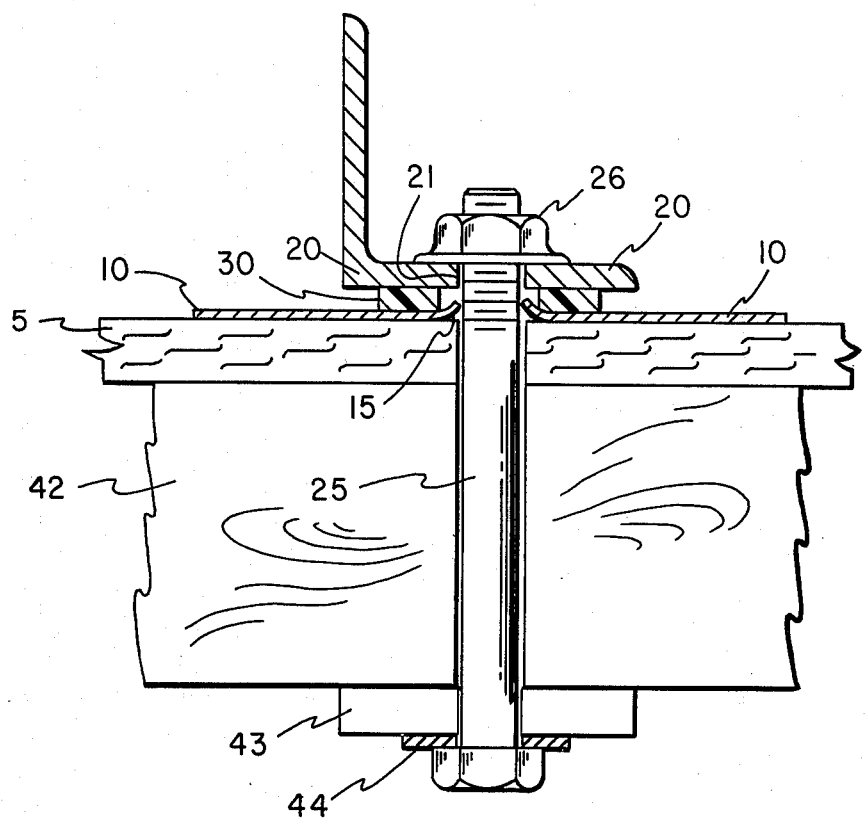

SEALING METHOD

BACKGROUND OF THE INVENTION

This invention relates to techniques for long-term water-tight fastening of a mounting support, such as the mounting support of an equipment, to a roof surface, such as the roof of a house or building.

In the prior art, difficulties have been encountered in securely fastening mounting supports, such as the mounting supports of a solar collector equipment, to an external surface of a building in a manner whereby a long-term water-tight seal, which does not develop leaks, is achieved. Typically, a mounting support is connected to a roof structure by securing a bolt through roof flashing, then applying sealant such as asphalt cement to the bolt and to the flashing, which sealant is the primary barrier against water penetration. Notwithstanding attempts at sealing the hole through which a bolt passes, leaks are found to develop with this technique, especially when the sealant or roof surface ages and deteriorates.

It is an object of the present invention to provide an improved method of fastening a mounting support to a roof surface in a long-term water-tight fashion.

SUMMARY OF THE INVENTION

The present invention is directed to an improved method of fastening, in a leak-tight manner, a mounting support to a roof surface. In accordance with an embodiment of the invention, a sheet metal flashing is provided, and a flared hole is placed on the roof with the flared hole aligned with a hole in the roof and protruding upward from the roof. A mounting pad is applied to the roof flashing over the upwardly flared hole therein, with a hole in the pad surrounding the flared hole in the flashing. The mounting support is bolted to the roof surface by passing a bolt through the mounting support, the pad, and the holes. The bolt engages the mounting support and the underside of the roof element so as to secure the mounting support to the roof surface with the pad and the flashing pressed therebetween in the region of the flared hole. Applicant has found that this sealing technique provides a reliable, water-tight seal in which leaks do not readily develop, even over long periods of time.

Further features and advantages of the invention will become more readily apparent from the following detailed description when taken in conjunction with the accompanying drawings.

BRIEF DESCRIPTION OF THE DRAWING

The drawing is a cross-sectional view of a mounting support fastened to a roof surface using the technique of the present invention.

DESCRIPTION OF THE PREFERRED EMBODIMENT

Referring to the drawing, there is shown a mounting support 20 which is fastened and sealed to roof surface 5 using the technique of the invention. The mounting support 20, which may be the mounting support for any equipment or equipment housing (such as the housing of a solar energy collector), typically includes an opening 21 through which a mounting bolt or rod 25 is inserted and engages a nut 26. In the example shown in the drawing, the bolt 25 passes through the roof deck 5, rafter 42, spanner 43, and a metal washer 44.

In accordance with the invention, a flared hole 15 is formed in a sheet of flashing material 10, the flare being directed upward toward the mounting support. If the flashing is made of metal, the flare may be formed by a punching operation with a male and female die, where the female die is sized larger than normal. If the flashing is made of moldable materials, such as plastic or rubber, the flared hole would typically be formed by molding. A flare of about ¼ inch height and of just larger diameter than the bolt is found to be particularly suitable. The upward-flared surface (walls of the hole) is the primary barrier against water penetration. It provides a mechanical means to prevent water travel into the bolt hole, because water must travel upward, against gravity, in order to gain access to the hole. A mounting pad 30 provides a wind barrier such that the water cannot be blown against and forced up to sides of the flare. The pad also provides a protective surface on which to mount the mounting support to prevent damage to the flashing. Because this seal is mechanical, it will continue to function over long periods of time. Even if the resilient mounting pad significantly deteriorates, water will still be shed by the sloped walls of the flared hole. Conventional seals depend principally upon an elastomeric sealing compound for seal integrity. An elastomeric seal will leak when either the elastomer or the substrate to which it is attached deteriorates or when the elastomer-to-substrate bond breaks for any reason, such as vibration or normal expansion and contraction. An elastomeric seal therefore has a very limited lifetime and will necessarily have to be repaired periodically, thus incurring unnecessary maintenance costs. Additionally, the threat of water damage to the interior of the building on which the seal is located is always present with conventional seals.

The mounting pad 30, which is formed of rubber in the present embodiment, has a central circular hole which surrounds the upward flared hole 15. As seen in the drawing, the pad 30 is placed between the roof flashing 10 and the mounting support 20. The pad 30 may be of any suitable shape, for example, square or circular. Used in conjunction with the flare having an elevation of about ¼ inch, a pad having a thickness of about ½ inch is found to be suitable. The pad thickness can vary but it should be sufficiently thick so that the top is not below the top of the upward flared hole when the pad is compressed with the anchor bolt, in order to provide sufficient clearance between the top of the flare and the mounting support. A wet elastomeric seal can be optionally applied between the pad and the adjacent surface on both sides of the pad, to provide a secondary sealing barrier.

Applicant has found that the disclosed sealing technique provides a water-tight seal that is inexpensive, long lasting, and reliable, and virtually eliminates maintenance.

I claim:

1. A method of fastening, in a weather-tight manner, a mounting support to a roof surface, comprising the steps of:
   providing a sheet of flashing material;
   forming a flared hole in said flashing which protrudes from the flashing;
   forming a hole in said roof;

placing said flashing on said roof with the flared hole of said flashing being aligned with the hole in said roof and protruding upward from said roof;

applying a resilient pad on said roof flashing in the region of said flared hole and surrounding said flared hole;

bolting said mounting support to said roof surface by securing a bolt through said mounting support, said pad and said holes, said bolt engaging said mounting support and the underside of said roof surface so as to secure said mounting support to said roof surface with said roof flashing and said resilient pad pressed therebetween in the region of said flare.

* * * * *